J. E. MITCHELL AND D. PARKS.
HULL BOARD CONSTRUCTION.
APPLICATION FILED MAR. 17, 1919.

1,360,132.

Patented Nov. 23, 1920.
2 SHEETS—SHEET 2.

INVENTORS
John E. Mitchell
Dennis Parks
BY
their ATTORNEY

UNITED STATES PATENT OFFICE.

JOHN E. MITCHELL AND DENNIS PARKS, OF ST. LOUIS, MISSOURI.

HULL-BOARD CONSTRUCTION.

1,360,132.  Specification of Letters Patent.  Patented Nov. 23, 1920.

Application filed March 17, 1919. Serial No. 283,033.

*To all whom it may concern:*

Be it known that we, JOHN E. MITCHELL and DENNIS PARKS, citizens of the United States, residing in the city of St. Louis and State of Missouri, have invented new and useful Improvements in Hull-Board Construction, of which the following is a specification.

This invention relates to improvements in boll breaking and cotton separating machines of the single hull-board type, and has for its general object the provision of improved means for preventing congestion in the working chamber of the machine.

To this end the invention comprises an improved hull board construction, whereby, in the operation of the machine, the hull board is periodically moved to widen the opening between its lower edge and the saw cylinder, to permit the free escape from the working chamber of any products that have accumulated therein. The invention also comprises operating mechanism coördinating the movement of the hull board with the feeding mechanism, whereby the feed of bolls and cotton to the machine is stopped before the hull board is moved to the discharge position, and the hull board is restored to its normal position before the feed is resumed.

Figure 1:
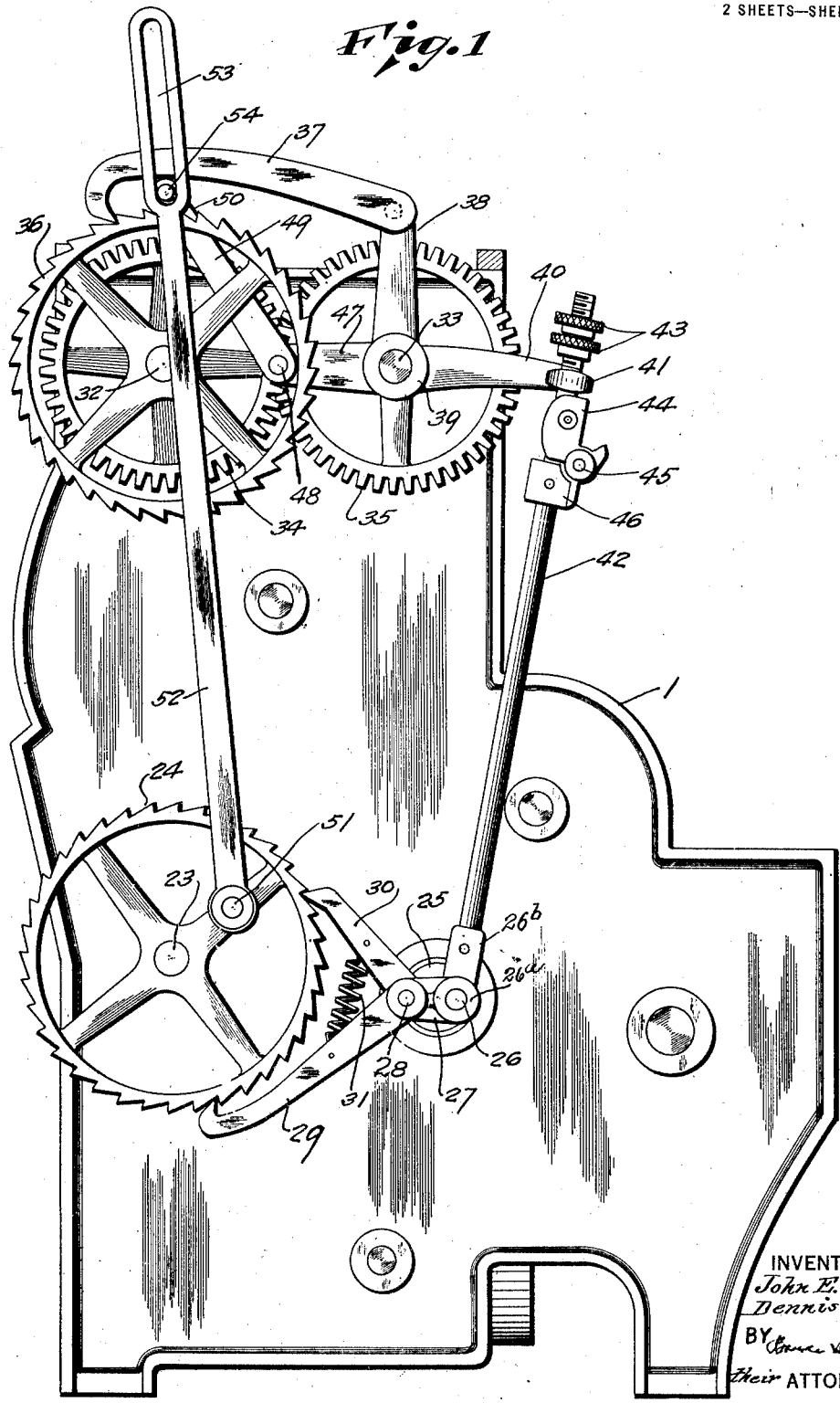
Figure 2:
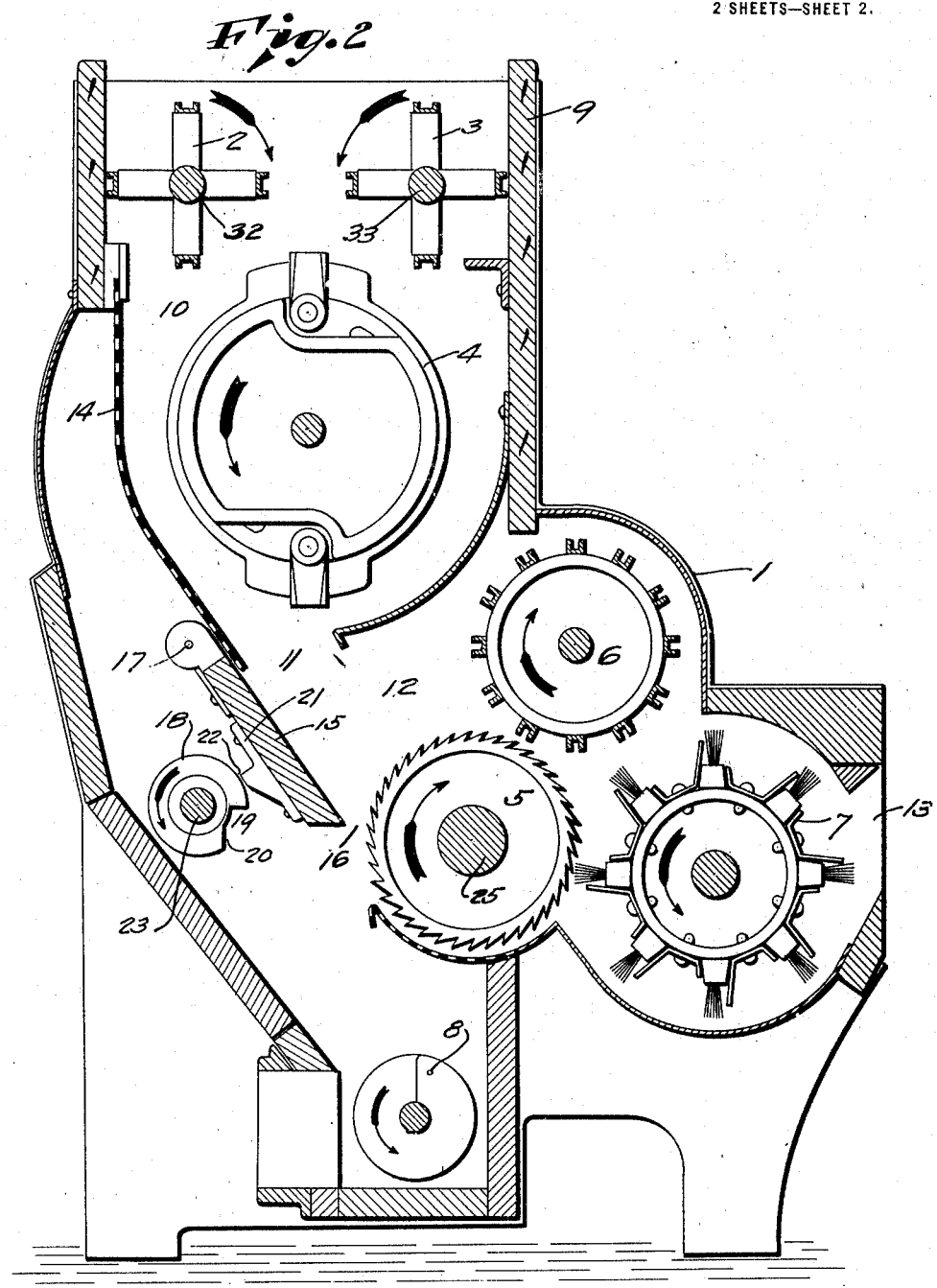

In the accompanying drawing;

Figure 1 is a view in side elevation of a machine constructed according to our invention; and Fig. 2 is a cross-sectional view thereof.

Referring now to the drawings, the numeral 1 indicates, generally, the casing of the machine, in which are mounted for rotation in the respective directions indicated by the arrows, feed rolls 2, 3, a boll-breaking cylinder 4, a saw cylinder 5, a kicker roll 6, a doffer-roll 7 and a conveyer 8. The upper part of the machine provides a hopper 9 into which the gathered bolls are thrown, and the raw product is fed by the feed-rolls 2, 3 into a chamber 10, in which the boll-breaking cylinder 4 operates, the latter serving to break apart the bolls and discharge the mixed cotton and hulls resulting through an outlet 11 into a working chamber 12. In this working chamber the cotton is caught up by the saw cylinder 5 and carried beneath the kicker roll 6, which operates to knock back hull particles carried up by the cotton. The cotton carried through by the saw cylinder is removed therefrom by the doffer roll 7 and discharged through an outlet 13. The numeral 14 indicates a screen forming one wall of the boll-breaking chamber and through which a certain amount of dirt, dust and the like will be separated from the cotton by the agitation occurring in the boll-breaking chamber. The numeral 15 indicates the hull-board, which occupies an inclined position relative to the saw cylinder and operates, as well understood, to cause the mixed cotton and hulls to be fed downward toward the saw cylinder, so that the cotton may be caught up by the saws. The lower end of this hull-board is located at a distance from the saw cylinder to provide a passage 16, through which the hull particles, trash, dirt, and the like, may escape and fall into the conveyer 8, to be discharged from the machine.

In certain of the prior machines in which one or the other, or both, of the present applicant's appear as inventors, the use of a stationary hull board is disclosed. With the use of such a hull-board it is necessary that the space 16 for the discharge of hulls should be sufficiently small to prevent the escape of cotton with the hulls, and it was soon found that unopened bolls, and other particles, or bodies, too large to pass through this opening, would accumulate in the working chamber and form a nucleus about which the cotton would gather to form a roll, due to the circular motion imparted to the products by the saw cylinder, and in other respects serve to congest the working chamber and prevent the free engagement of the saws with the cotton therein. To overcome this objection the double hull board construction disclosed in Patent No. 1,030,913, dated July 2, 1912, was devised by this coinventor, John E. Mitchell. In a pending application recently filed by us we have shown a construction of a single-type hull board which is also designed to prevent congestion in the working chamber.

The present application discloses another means for accomplishing this same purpose, and is of somewhat simpler construction than either of the previous machines referred to. In certain circumstances, as where the boll breaking and cotton separating machine is employed in a portable harvester, so that the separation of the cotton occurs as the bolls are gathered, the present type of machine, by reason of the simplicity of its construction, will present advantages over either of the machines referred to.

To accomplish the purpose set forth, the present machine embodies the principle of periodically enlarging the discharge from the working chamber, so as to permit of dumping any bolls or waste products which have accumulated in the working chamber. To this end, the hull board 15 is pivotally mounted at its upper end, as indicated at 17, between the side members of the casing, so that its lower end may be moved toward and from the saw cylinder 5. Located beneath the hull board is a cam roller 18 provided in its periphery with a recess 19 affording a cam surface 20. Secured on the under side of the hull board is a plate 21 having a rearwardly projecting lug 22 which in the normal position of the hull board, shown in Fig. 2, rests upon the surface of the roller 18, and when the recess 19 passes under said lug the latter falls into said recess, thereby automatically widening the opening 16. As the cam continues to revolve the cam surface 20 engages the lug 22 and gradually raises the hull-board until the lug again rests on the periphery of said roller. The cam roller 18 is mounted on a rod projecting through the casing and having secured thereon a ratchet wheel 24. The shaft 25 of the saw cylinder also projects through the same side of the casing as the rod 23, and is provided with a crank-pin 26 on which is pivotally mounted a hub 26ª having an integral socket-member 26ᵇ and an integral crank-arm 27 which has pivotally mounted on its outer end at 28, two ratchets, 29 and 30, respectively, connected by a spring 31. In the rotation of the shaft 25 the ratchets 29 and 30 will be operated by the arm 27 to alternately pull and push the ratchet wheel 24 to cause its rotation and thereby the rotation of the cam roller 18. The shafts 32 and 33 of the feed rolls 2 and 3 also project through the same side wall of the casing as the rod 23 and shaft 25, and have secured on their projecting ends gears 34 and 35, respectively, which are in mesh with each other. Secured on the end of the shaft 32 is a ratchet wheel 36 which is adapted to be actuated in part by a ratchet 37 pivotally mounted on the upper end of an arm 38 of a double bell-crank lever 39, which is pivotally mounted on the outer end of the shaft 33.

A second arm 40 of this bell-crank lever is provided on its end with an apertured lug 41 through which extends loosely the upper end of a pitman rod 42, the upper end portion of which is screw-threaded to receive adjusting nuts 43, and below the lug 41 is provided with a bumper 44 which is pivotally mounted at 45 on a block 46 secured on the pitman rod 42. The lower end of the pitman rod is secured in the socket-member 26ᵇ previously referred to. The bell crank lever 39 is provided with a third arm 47 on the outer end of which is pivotally mounted at 48 the lower end of a lever arm 49 the upper end of which is provided with a ratchet 50 engaging the teeth of the ratchet wheel 36. As the shaft 25 revolves the crank pin 26 will cause the rod 42 to be alternately raised and lowered. In its upward movement the bumper 44 will engage the lug 41 and rock the bell crank lever 39, and thereby move the ratchet 37 backward over the teeth of the ratchet wheel 36 while at the same time by drawing the lever arm 49 downward the ratchet 50 will cause the ratchet wheel 36 to be rotated. As the pitman rod moves downward the lower adjusting nut 43 will engage the lug 41 and thereby rock the bell crank lever in the opposite direction causing the ratchet 50 to ride over the teeth of the ratchet wheel 36 and the ratchet 37 to rotate said ratchet wheel. Thus, the ratchet wheel 36 is practically continuously rotated and being fast on the shaft 32 this will result in rotating the feed rolls 2 and 3 through the medium of the gears 34 and 35.

By turning the bumper 44 downward on its pivot 45, so that it will not engage the lug 41 the operation of the feed rolls can be discontinued at any time without otherwise stopping the operation of the machine. In order to coördinate the feed mechanism with the movement of the hull board 15, the following construction is provided:

Mounted on the ratchet wheel 24 is a crank pin 51 on which is pivotally mounted the lower end of a pitman 52, the upper end of which is provided with an elongated slot 53. At the upper end of the lever arm 49 there is provided a stud 54 adapted to work in the slot 53 and to be engaged by the bottom thereof. The under side of the ratchet 37 normally rests on the upper end of the lever arm 49, as shown.

The driving mechanism rotating the various rotatable elements of the machine, consisting of any preferred arrangement of belts, gears and the like, is fully shown and described in prior cases and it is not considered necessary to illustrate the same herein.

In operation, as the ratchet wheel 24 is rotated in the manner described by the ratchets 29 and 30, the cam roll 18 will be rotated slowly in the direction indicated by the arrow in Fig. 2, and the pitman 52 will be gradually raised. The adjustment of the parts is such that just before the recess 19 is moved under the lug 22, the bottom of the slot 53 will engage the stud 54 and raise the arm 49, thereby raising ratchets 37 and 50 and stopping the rotation of ratchet wheel 36 and therefore of the feed rolls 2 and 3, so that the supply of raw product to the working chamber is stopped, and the saw cylinder 5, which rotates very rapidly, is given the opportunity of catching up any cotton in the working chamber before the contents of said working chamber are discharged. Thereafter the surface of the roller 18 moves from under the lug 22, which drops into the recess 19 as the hull board 15 swings downward by gravity. This movement of the hull board, of course, widens the opening 16, and permits the discharge from the working chamber of any bolls or waste products which have accumulated therein. As the feed will have been stopped, however, before the hull board is moved to permit the discharge of the contents of the working chamber, no valuable product, other than unopened bolls, will be discharged from the machine. To explain the presence of unopened bolls in the working chamber, it may be stated that a certain number of these bolls will inevitably escape from the boll breaking chamber without being broken apart by cylinder 4, and as these unopened bolls are too large to pass through the opening 16, in the operative position of the hull board, they gradually accumulate in the working chamber and in time would cause a congestion therein, as stated, if some means were not provided for getting rid of them. These bolls, after being discharged from the working chamber, can be recovered and subjected to further treatment if desired, and as disclosed in the pending application referred to, but such action is not contemplated with the present type of machine.

After the products of the working chamber have been discharged in the manner above described, the continued rotation of the cam roll 18 will cause the cam surface 20 to engage the lug 22 and raise the hull board to its normal, or operative, position, which is that shown in Fig. 2, and thereafter the pitman will be lowered by the movement of the ratchet wheel 24 to permit the ratchets 37 and 50 to again operate the feeding rolls.

We claim:—

1. A boll breaking and cotton separating machine affording a working chamber, cotton separating mechanism operating therein, feed mechanism for delivering material to said chamber to be operated on by the cotton separating mechanism, means for periodically discharging accumulated products from said working chamber, and means for stopping the operation of the feed mechanism prior to said discharging operation.

2. A boll breaking and cotton separating machine affording a working chamber, cotton separating mechanism operating therein, feed mechanism for delivering material to said chamber to be operated on by the cotton separating mechanism, means operating automatically in the operation of the machine to periodically discharge accumulated products from said working chamber and automatic means for stopping said feed mechanism prior to said discharging operation.

3. A boll breaking and cotton separating machine affording a working chamber, cotton separating mechanism including a saw cylinder operating in said chamber, a hull board coöperating with said saw cylinder, the bottom of which defines the size of an opening past the saw cylinder for the escape of hulls, and means operating periodically to move said hull board to widen said opening to permit the escape of accumulated products from said chamber.

4. A boll breaking and cotton separating machine affording a working chamber, cotton separating mechanism including a saw cylinder operating in said chamber, feed mechanism for delivering material to said chamber to be operated on by the cotton separating mechanism, a hull board coöperating with the saw cylinder, the bottom of which defines the size of an opening past the saw cylinder for the escape of hulls, means operating to periodically move said hull board to widen said opening to permit the discharge of accumulated products from said working chamber, and means operating to stop the feed mechanism prior to said movement of the hull board.

5. A boll breaking and cotton separating machine affording a working chamber, cotton separating mechanism including a saw cylinder operating in said chamber, feed mechanism for delivering material to said working chamber to be operated on by the separating mechanism, a movable hull board coöperating with the saw cylinder, the bottom of which defines the size of an opening past said saw cylinder for the escape of hulls, means operating periodically to cause movement of said hull board to widen said opening to permit the discharge of accumulated products from the working chamber, and means for periodically stopping said feed mechanism, said means being coördinated to cause the feed mechanism to stop before the movement of said hull board to widen said opening, and to cause said hull board to be restored to normal position before the feed mechanism is again placed in operation.

6. A boll breaking and cotton separating machine affording a working chamber, cotton separating mechanism including a saw cylinder working in said chamber, a pivoted hull board coöperating with said saw cylinder, the bottom of which defines the size of an opening past the saw cylinder for the escape of hulls, a rotatable cam roll normally supporting said hull board in its operative position and operating in its rotation to periodically permit said hull board to swing away from the saw cylinder to widen said opening, whereby to discharge accumulated products from the working chamber, and then to restore the hull board to its normal position.

7. A boll breaking and cotton separating machine affording a working chamber, cotton separating mechanism including a saw cylinder working in said chamber, a pivoted hull-board coöperating with said saw cylinder, the bottom of which defines the size of an opening past the saw cylinder for the escape of hulls, a lug on the bottom of said hull-board, and a rotatable cam roll on which said lug rests for supporting the hull board in its normal position, said cam roll having a recess into which said lug may fall to permit the hull board to swing away from the saw cylinder to widen said opening to permit the discharge of accumulated products from the working chamber, and said recess having a cam surface for engaging said lug to restore the hull board to its normal position.

8. A boll breaking and cotton separating machine affording a working chamber, cotton separating mechanism including a saw cylinder working in said chamber, a pivoted hull board coöperating with said saw cylinder, the bottom of which defines the size of an opening past the saw cylinder for the escape of hulls, a lug on the bottom of said hull board, a rotatable cam roll on which said lug rests for supporting the hull board in its normal position, said cam roll having a recess into which said lug may fall to permit the hull board to swing away from the saw cylinder to widen said opening to permit the discharge of accumulated products from the working chamber, and said recess having a cam surface for engaging said lug to restore the hull board to its normal position, feed mechanism for delivering material to the working chamber, means for actuating said feed mechanism, a rotary member movable with said cam roll, mechanism operated by said movable member for alternately engaging and releasing the feed actuating means, whereby to stop or permit the feeding operation, the adjustment of the parts being such that the feed mechanism will be stopped before the hull board swings away from the saw cylinder and the hull board will be restored to normal position before the feed mechanism is again placed in operation.

9. A boll breaking and cotton separating machine affording a working chamber for receiving the mixed cotton and hulls to be separated and having an outlet for hulls, cotton separating mechanism operating in said chamber, and means for periodically widening said outlet to permit the escape of accumulated products from said chamber.

In testimony whereof, we have hereunto set our hands.

JOHN E. MITCHELL.
DENNIS PARKS.